(12) United States Patent
Morales et al.

(10) Patent No.: US 10,427,209 B2
(45) Date of Patent: Oct. 1, 2019

(54) STEAM CUSHION FORMING

(71) Applicant: GM GLOBAL TECHNOLOGY OPERATIONS LLC, Detroit, MI (US)

(72) Inventors: Arianna T. Morales, Royal Oak, MI (US); Raja K. Mishra, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 276 days.

(21) Appl. No.: 15/584,506

(22) Filed: May 2, 2017

(65) Prior Publication Data

US 2018/0318909 A1 Nov. 8, 2018

(51) Int. Cl.
| | |
|---|---|
| *B21J 3/00* | (2006.01) |
| *B29C 33/00* | (2006.01) |
| *B21D 37/18* | (2006.01) |
| *B21J 13/02* | (2006.01) |
| *B21D 22/02* | (2006.01) |
| *B29C 33/60* | (2006.01) |
| *B29C 51/08* | (2006.01) |
| *B29C 51/26* | (2006.01) |
| *C03B 40/02* | (2006.01) |
| *B29C 51/10* | (2006.01) |

(Continued)

(52) U.S. Cl.
CPC ............. *B21J 3/00* (2013.01); *B21D 22/02* (2013.01); *B21D 37/18* (2013.01); *B21J 13/02* (2013.01); *B29C 33/60* (2013.01); *B29C 51/082* (2013.01); *B29C 51/263* (2013.01); *B29C 51/10* (2013.01); *B29C 2037/92* (2013.01); *B29L 2031/7132* (2013.01); *C03B 40/02* (2013.01); *C10N 2240/402* (2013.01)

(58) Field of Classification Search
CPC ................................... B21J 3/00; B21D 37/18
See application file for complete search history.

(56) References Cited

U.S. PATENT DOCUMENTS

| | | | | |
|---|---|---|---|---|
| 3,756,051 | A | * | 9/1973 | Rebsamen ............. B21D 37/18 72/45 |
| 4,223,544 | A | * | 9/1980 | Main .................... B21D 22/286 72/45 |

(Continued)

FOREIGN PATENT DOCUMENTS

DE 10202201 A1 * 7/2003 ............. B21D 37/18

OTHER PUBLICATIONS

Titanium Alloy, https://web.archive.org/web/20160410113506/https://en.wikipedia.org/wiki/Titanium_alloy (Year: 2016).*

*Primary Examiner* — Pradeep C Battula
(74) *Attorney, Agent, or Firm* — Quinn IP Law

(57) ABSTRACT

A method of forming a part from a blank includes positioning the blank within a forming die. Water is introduced between the blank and the forming die. The water is heated to form steam between the blank and the forming die. The blank is reshaped within the forming die to form the part while the steam is disposed between the blank and the forming die. The steam forms a cushion between the blank and the forming die to reduce friction therebetween. A lubricant is not applied to the blank prior to being positioned in the forming die. Therefore, the formed part does not require a washing step after being formed.

20 Claims, 3 Drawing Sheets

(51) Int. Cl.
　　　*B29L 31/00*　　　(2006.01)
　　　*B29C 37/00*　　　(2006.01)

(56) References Cited

U.S. PATENT DOCUMENTS 5,953,914 A * 9/1999 Frangipane ............. F01B 17/04
　　　　　　　　　　　　　　　　　　　　　60/370
2011/0302979 A1* 12/2011 Oppenheimer ............ B21J 3/00
　　　　　　　　　　　　　　　　　　　　　72/42

* cited by examiner

STEAM CUSHION FORMING

The disclosure generally relates to a method of shaping a part with a forming die.

Many parts are shaped using a forming die. In a typical process, a blank is placed within the forming die, and the forming die is actuated to reshape the blank into the desired shape of the part. Due to the high pressure required to reshape the blank, significant friction may result between the blank and the forming die, especially in areas such as sharp radii, deep draw features, etc. In order to reduce the friction between the forming die and the blank, a lubricant, such as but not limited to an oil, wax, etc., may be applied to the entire blank before it is placed in the forming die. The lubricant remains on the blank after the part has been formed, and must be washed or otherwise removed before other finishing operations may be performed on the part.

SUMMARY

A method of forming a part from a blank is provided. The method includes positioning the blank within a forming die. Water is introduced between the blank and the forming die. The water is heated to form steam between the blank and the forming die. The blank is reshaped within the forming die to form the part while the steam is disposed between the blank and the forming die. The steam forms a cushion between the blank and the forming die to reduce friction therebetween.

Notably, a lubricant is not applied to the blank prior to being positioned in the forming die.

In another embodiment of the method described herein, the forming die includes a nozzle for dispensing water. The water is introduced between the blank and the forming die by injecting the water between the forming die and the blank with the nozzle, after the blank is positioned in the forming die. By so doing, the water may be injected onto a localized high friction area between the forming die and the blank.

In one aspect of the method described herein, the water may be heated prior to introducing the water between the blank and the forming die.

In one embodiment of the method described herein, heating the water to form the steam includes pre-heating the die to a pre-determined temperature prior to positioning the blank within the forming die.

In another embodiment of the method described herein, heating the water to form the steam includes heating the blank prior to positioning the blank in the forming die.

In one aspect of the method described herein, the water may be mixed with a water soluble lubricant prior to introducing the water between the blank and the forming die.

In another aspect of the method described herein, the blank may include, but is not limited to, one of a plastic material or a metal material. If the blank is a metal material, the blank may include, but is not limited to, aluminum, magnesium, or steel.

In another aspect of the method described herein, the formed part is removed from the forming die, after the forming die has reshaped the blank into the formed part.

In another aspect of the method described herein, the formed part is dried after being removed from the forming die, in order to evaporate any condensate remaining on the formed part from the steam. Because the blank did not include any lubricants for lubricating the blank during the forming process, once the formed part is dry, no lubricant exists on the formed part.

Accordingly, the method described herein uses the steam cushion to lubricate the blank during the forming process, instead of a lubricant. The compression of the steam during the shaping of the part within the forming die, which has little time to escape, provides an instantaneous cushion to the blank being pushed into the forming die. The steam cushion resists contact between the blank and the forming die, which reduces friction therebetween. Once the formed part is removed, and the part is dried to remove any condensate from the steam, the formed part is ready for additional manufacturing processes, and does not require any additional washing to remove residual lubricant.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the FIGS., wherein like numerals indicate like parts throughout the several views, a method of forming a part 20 from a blank 22 is described herein. The method may be used with any forming process the shapes a blank 22 with some configuration of a forming die 24, in which the forming die 24 and the blank 22 are pressed together to shape the blank 22 into a new form, i.e., the formed part 20. For example, the forming process may include stamping, hot forming, warm forming, bending, etc. The formed part 20 may include any shape and size that may be formed from with the specific forming process being utilized.

The blank 22 may be in sheet form, or alternatively, may be pre-formed and/or tailor made to have a shape that is non-planar. The blank 22 may be, but is not limited to, a plastic material or a metal material. If the blank 22 is a metal material, the blank 22 may be, but is not limited to, aluminum, magnesium, or steel. For the purpose of the method described herein, the blank 22 may be supplied without a lubricant being applied onto the blank 22. As used herein, the term "lubricant" includes any lubricating compound that may be applied to the blank 22 prior to the forming process, such as but not limited to an oil, wax, paste, etc.

Figure 1:
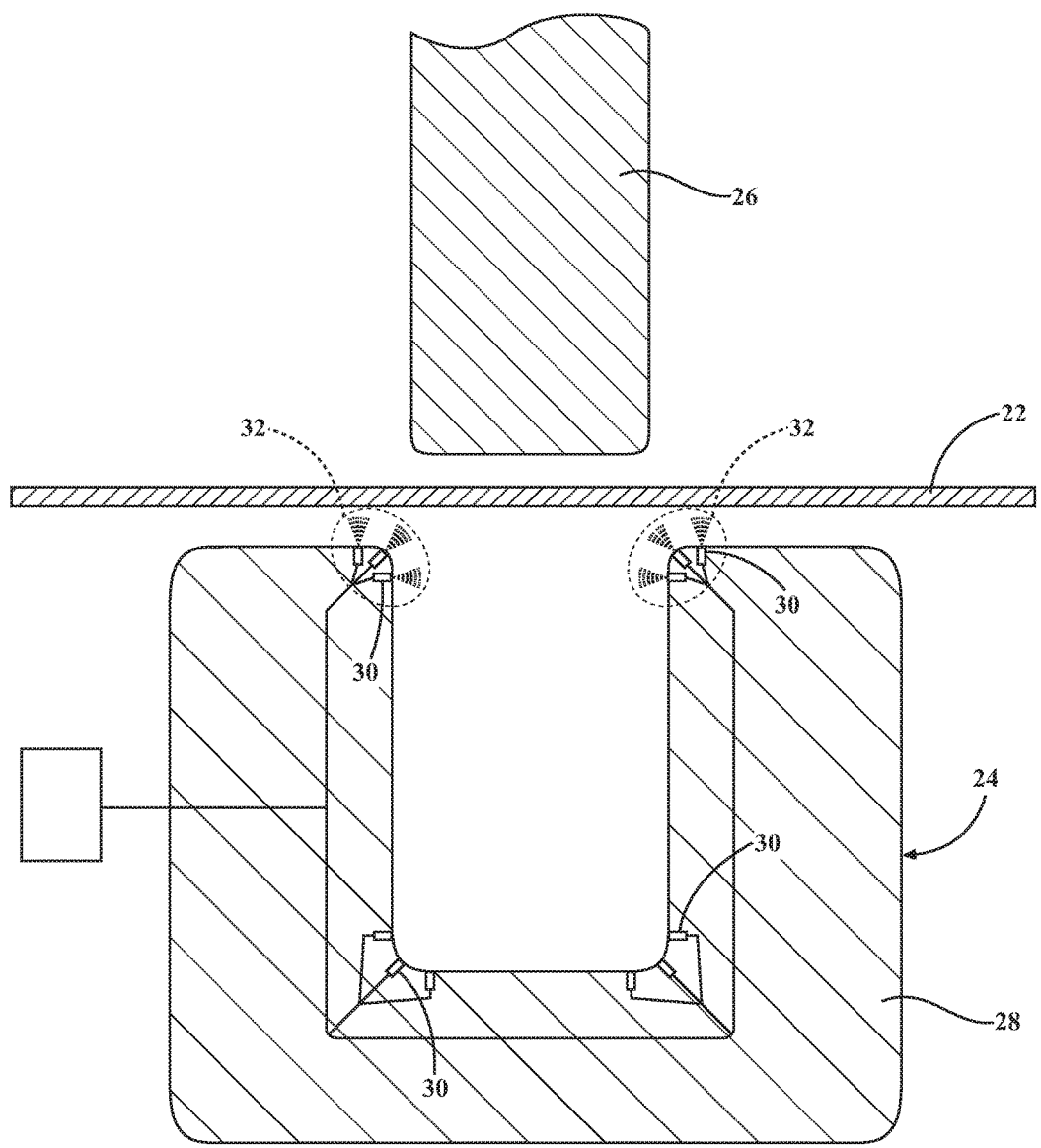
FIG. 1 is a schematic cross sectional view of a blank positioned in a forming die.

Referring to FIG. 1, the method includes positioning the blank 22 within the forming die 24. Exactly how the blank 22 is positioned within the forming die 24 will depend upon the specific type of forming process being used, and the specific configuration of the forming die 24. For example, the blank 22 may be placed between two halves of a die, so that a press may move a first half 26 of the forming die 24 towards and against a second half 28 of the forming die 24, thereby forming the blank 22 therebetween. The manner in which the blank 22 is positioned in the forming die 24 for each specific type of forming process is known to those skilled in the art, and is therefore not described in detail herein. As noted above, the blank 22 may be supplied without a lubricant being applied to any surface of the blank 22. Accordingly, it should be appreciated that a lubricant need not be applied to the blank 22 before positioning the blank 22 within the forming die 24.

Water is introduced between the blank 22 and the forming die 24. A water soluble lubricant may be thoroughly mixed with the water prior to introducing the water between the blank 22 and the forming die 24.

The water may be introduced in between the blank 22 and the forming die 24 in any suitable manner. For example, the forming die 24 may be equipped with one or more nozzles 30. The nozzles 30 may include any device that is capable of dispensing a controlled amount of fluid, e.g., water, curing the actual shaping of the blank 22. If the forming die 24 is so equipped, the water may be introduced between the blank 22 and the forming die 24 by injecting the water between the forming die 24 and the blank 22 with the nozzles 30, after the blank 22 has been positioned in the forming die 24, and while the blank 22 is being shaped by the forming die 24. The nozzles 30 may be positioned within the forming die 24 so that the water is only introduced into localized high friction regions 32 or areas between the forming die 24 and the blank 22. Accordingly, water does not have to be applied to the entire surface interface between the forming die 24 and the blank 22, but rather, may be applied only to the localized high friction regions 32 that require lubrication. Regions in which the blank 22 is bent or shaped to form sharp corners or radii, or regions in which the blank 22 is drawn out or stretched, can generate high levels of friction, and may be referred to herein as localized high friction regions 32. Other areas between the blank 22 and the forming die 24, which do not significantly reshape the blank 22, may generate little or no friction, and do not require lubrication.

The water that is introduced between the forming die 24 and the blank 22 is heated until the water transforms states and turns into steam. As used herein, the term "steam" is defined as "water in the form of an invisible gas or vapor when heated to the boiling point, or the vapor into which water is converted when heated." The water may be heated in any manner capable of heating the water to the boiling point and converting the water into steam. In one embodiment, the water is heated prior to introducing the water between the blank 22 and the forming die 24. The water may be heated in any suitable manner, with any suitable device. For example, a furnace or heat exchanger may be used to transfer heat from a heat source, such as a flame, to the water that is later introduced in-between the blank 22 and the forming die 24. In another embodiment, the forming die 24 may be pre-heated before the water is injected in-between the forming die 24 and the blank 22. If the forming die 24 is pre-heated to an appropriate temperature, the water introduced in-between the forming die 24 and the blank 22 will vaporize upon contacting the forming die 24, thereby forming steam. Similarly, in another embodiment, the blank 22 may be pre-heated before being positioned into the forming die 24 and before the water is introduced in-between the forming die 24 and blank 22. If the blank 22 is pre-heated to an appropriate temperature, the water introduced in-between the forming die 24 and the blank 22 will vaporize upon contacting the blank 22, thereby forming steam. Furthermore, it should be appreciated that the water may be heated using multiple embodiments described herein. For example, the water, the forming die 24, and the blank 22 may all be pre-heated to respective pre-determined temperatures prior to the water being introduced in-between the forming die 24 and the blank 22.

Figure 2:
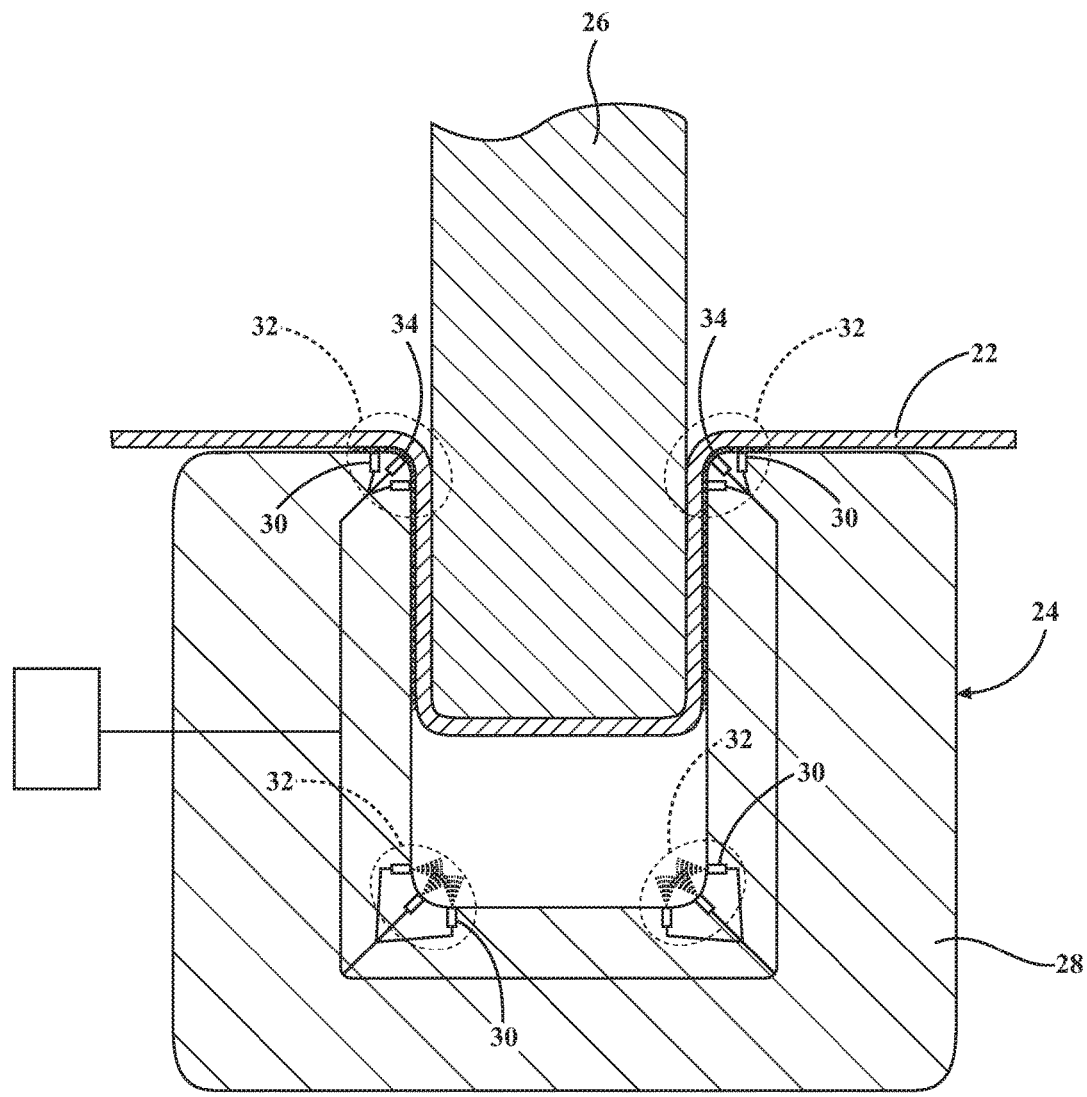
FIG. 2 is a schematic cross sectional view of the blank partially shaped within the forming die, and showing multiple steam cushions in localized high friction regions.

As soon as the water has been heated and transformed into steam, the blank 22 is shaped within the forming die 24 to form the part 20, while the steam is disposed between the blank 22 and the forming die 24. It should be appreciated that the shaping step may begin before the water has been vaporized into steam, and that the water may be injected in-between the forming die 24 and the blank 22 with one of the nozzles 30 as the blank 22 is being shaped. Referring to FIG. 2, the steam trapped between the forming die 24 and the blank 22 forms a cushion, referred to herein as a steam cushion 34, between the blank 22 and the forming die 24. The steam cushion 34 resists contact pressure between the forming die 24 and the blank 22, which reduces friction therebetween, thereby acting as a lubricant. Furthermore, as noted above, the water may be injected only into the localized high friction regions 32, so that the steam cushions 34 are only formed within the localized high friction regions 32 for lubricating these areas.

Figure 3:
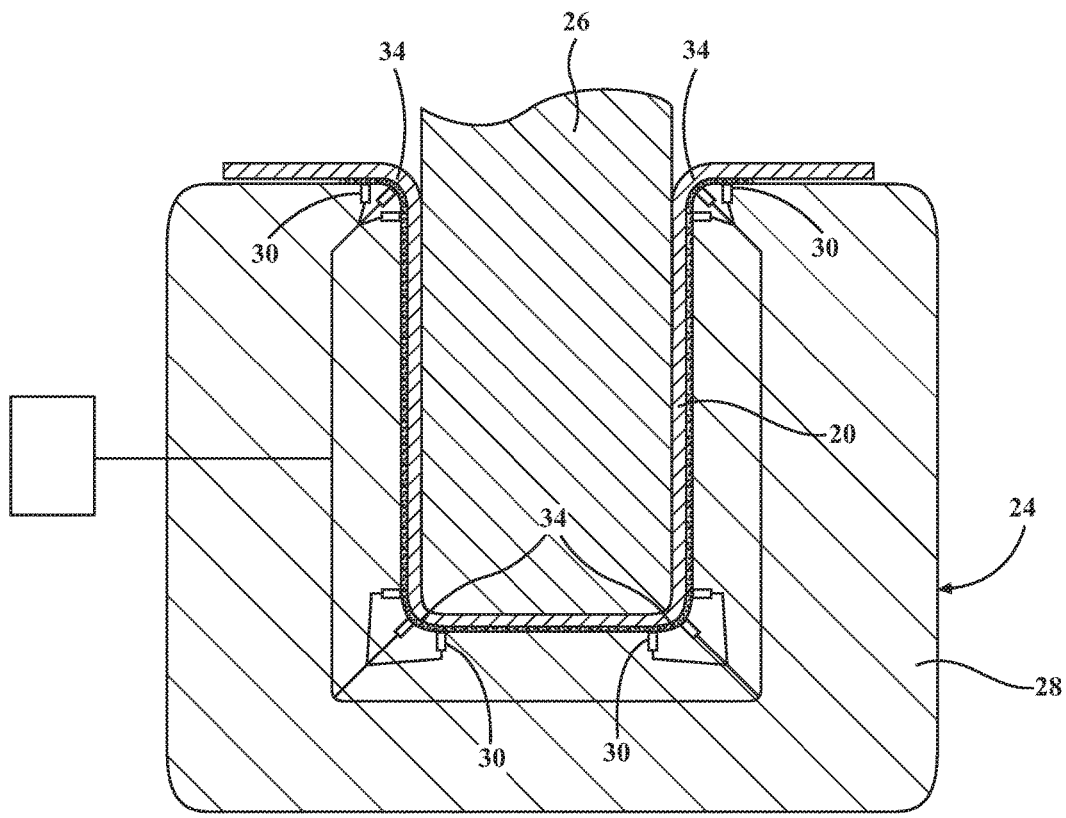
FIG. 3 is a schematic cross sectional view of the blank fully shaped into the part within the forming die, and showing multiple steam cushions in localized high friction regions.
Figure 4:
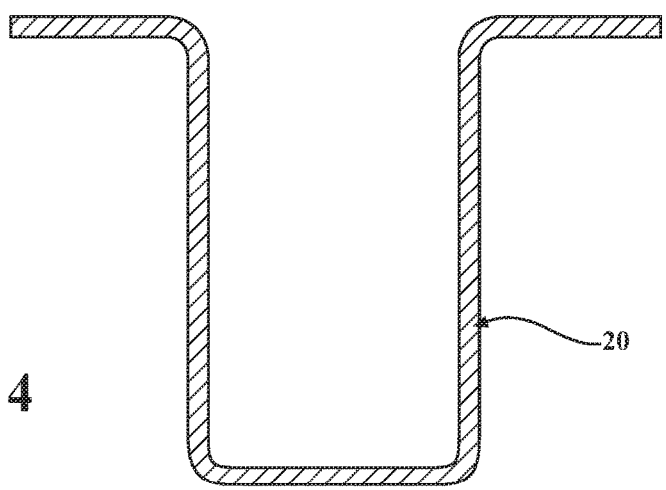
FIG. 4 is a schematic cross sectional view of a formed part removed from the forming die.

Referring to FIG. 3, once the part 20 has been formed within the forming die 24, the formed part 20 may be removed from the forming die 24. The formed part 20 may be removed in any manner known to those skilled in the art. Once the formed part 20 is removed, it is possible that the steam may condense and form liquid water droplets on the formed part 20. Accordingly, the formed part 20 may be dried after being removed from the forming die 24 to eliminate any condensate remaining on the formed part 20 from the steam. The formed part 20 may be dried in any suitable manner. For example, the formed part 20 may be placed in an oven for a period of time, or alternatively, may simply be left to air dry. As noted above, the blank 22 may be supplied without any lubricants applied thereon. As such, once any water condensate on the formed part 20 has been removed by drying the formed part 20, the formed part 20 is left clean, without any residue that may interfere with other manufacturing processes, such as welding or painting.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A method of forming a part from a blank, the method comprising:
   positioning the blank within a forming die, wherein:
      the forming die includes a first half and a second half;
      the second half includes an exterior surface and a cavity;
      the cavity has a shape, an inside wall and defines an opening through the exterior surface to receive the first half; and
      the blank is positioned against the exterior surface and covers the opening;

introducing water between the blank and the forming die through the inside wall of the cavity, wherein the water is introduced at:
- a first location on the inside wall adjacent the exterior surface; and
- a second location on the inside wall distant from the exterior surface;

heating the water to form steam between the blank and the forming die; and shaping the blank into the shape of the cavity within the second half of the forming die to form the part while the steam is disposed between the blank and the forming die, such that the steam forms a cushion between the blank and the forming die to reduce friction therebetween.

2. The method set forth in claim 1, wherein the forming die includes a plurality of nozzles integrated into the second half of the forming die for dispensing the water, and wherein the water is further introduced between the blank and the forming die through the exterior surface of the second half of the forming die at a third location adjacent the cavity after the blank is positioned in the forming die.

3. The method set forth in claim 1, wherein the first location and the second location are each defined as a localized high friction area between the forming die and the blank.

4. The method set forth in claim 1, wherein heating the water to form the steam includes heating the water prior to introducing the water between the blank and the forming die.

5. The method set forth in claim 1, wherein heating the water to form the steam includes heating the forming die to a pre-determined temperature prior to positioning the blank within the forming die.

6. The method set forth in claim 1, wherein heating the water includes heating the blank prior to positioning the blank in the forming die, and wherein the shaping begins before the water is vaporized into the steam.

7. The method set forth in claim 1, characterized by the blank not having a lubricant applied thereto prior to being positioned in the forming die.

8. The method set forth in claim 1, further comprising mixing the water with a water soluble lubricant prior to introducing the water between the blank and the forming die.

9. The method set forth in claim 1, wherein the blank is one of a plastic material or a metal material.

10. The method set forth in claim 1, wherein the blank is a metal material including one of aluminum, magnesium, or steel.

11. The method set forth in claim 1, further comprising removing the formed part from the forming die.

12. The method set forth in claim 11, further comprising drying the formed part after being removed from the forming die to eliminate any condensate remaining on the formed part from the steam, whereby no lubricant exists on the formed part.

13. A forming process comprising:
positioning a blank within a forming die, wherein:
- the blank does not include a lubricant applied thereto prior to being positioned in the forming die;
- the forming die includes a first half and a second half;
- the second half includes an exterior surface and a cavity;
- the cavity has a shape, an inside wall and defines an opening through the exterior surface to receive the first half; and
- the blank is positioned against the exterior surface and covers the opening;

introducing water between the blank and the forming die through the inside wall of the cavity, wherein the water is introduced at:
- a first location on the inside wall adjacent the exterior surface; and
- a second location on the inside wall distant from the exterior surface;

heating the water to form steam between the blank and the forming die;

shaping the blank into the shape of the cavity within the second half of the forming die to form a part while the steam is disposed between the blank and the forming die, whereby the steam forms a cushion between the blank and the forming die to reduce friction therebetween;

removing the formed part from the forming die; and drying the formed part after being removed from the forming die to eliminate any condensate remaining on the formed part from the steam, whereby no lubricant remains on the formed part.

14. The method set forth in claim 13, wherein the first location and the second location are each defined as a localized high friction area between the forming die and the blank.

15. The method set forth in claim 13, wherein heating the water to form the steam includes heating the water prior to introducing the water between the blank and the forming die.

16. The method set forth in claim 13, wherein heating the water to form the steam includes heating the forming die to a pre-determined temperature prior to positioning the blank within the forming die.

17. The method set forth in claim 13, wherein heating the water includes heating the blank prior to positioning the blank in the forming die, and wherein the shaping begins before the water is vaporized into the steam.

18. The method set forth in claim 13, wherein the steam is compressed within the second half of the forming die during the shaping of the blank.

19. The method set forth in claim 1, wherein the steam is compressed within the second half of the forming die during the shaping of the blank.

20. The method set forth in claim 13, wherein the forming die includes a plurality of nozzles integrated into the second half of the forming die for dispensing the water, and wherein the water is further introduced between the blank and the forming die through the exterior surface of the second half of the forming die at a third location adjacent the cavity after the blank is positioned in the forming die.

* * * * *